United States Patent [19]

Kono et al.

[11] Patent Number: 5,081,583
[45] Date of Patent: Jan. 14, 1992

[54] AUTOMATIC CONTROL SYSTEM FOR GEAR TRANSMISSION

[75] Inventors: Hiromi Kono; Akifumi Tanoue; Yuji Satoh, all of Higashimatsuyama, Japan

[73] Assignee: Diesel Kiki Co., Ltd., Tokyo, Japan

[21] Appl. No.: 442,761

[22] Filed: Nov. 29, 1989

[30] Foreign Application Priority Data

Dec. 12, 1988 [JP] Japan ................. 63-311945

[51] Int. Cl.⁵ ............................................ B60K 41/18
[52] U.S. Cl. .................................. 364/424.1; 74/866
[58] Field of Search ............... 364/424.1; 74/866, 867, 74/868

[56] References Cited

U.S. PATENT DOCUMENTS

| | | | |
|---|---|---|---|
| 4,621,328 | 11/1986 | Arai et al. | 364/424.1 |
| 4,645,045 | 2/1987 | Takefuta | 364/424.1 |
| 4,680,988 | 7/1987 | Mori | 364/424.1 |
| 4,698,762 | 10/1987 | Moriya et al. | 364/424.1 |
| 4,718,309 | 1/1988 | Moriya | 74/866 |
| 4,848,529 | 7/1989 | Kurihara et al. | 74/866 |
| 4,884,201 | 11/1989 | Sato et al. | 364/424.1 |

FOREIGN PATENT DOCUMENTS 60-175854  9/1985  Japan .

OTHER PUBLICATIONS

Copending U.S. patent application Ser. No. 07/216,528 filed Jul. 7, 1988, now abandoned.

*Primary Examiner*—Salvatore Cangialosi
*Attorney, Agent, or Firm*—Pollock, Vande Sande & Priddy

[57] ABSTRACT

In a system for automatically controlling a gear transmission wherein an actuator device coupled with an operation member for the gear-shifting operation of the transmission is controlled for shifting the transmission to a target gear position, the system is provided with a first control unit for producing target signals indicating target gear positions and transmission data showing the relationships between specific gear positions of the gear transmission and positions of the operation member. A second control unit responsive to the target signal and the transmission data to produce a control signal for controlling the actuator device so as to position the operation member to a position corresponding to the target gear position.

10 Claims, 5 Drawing Sheets

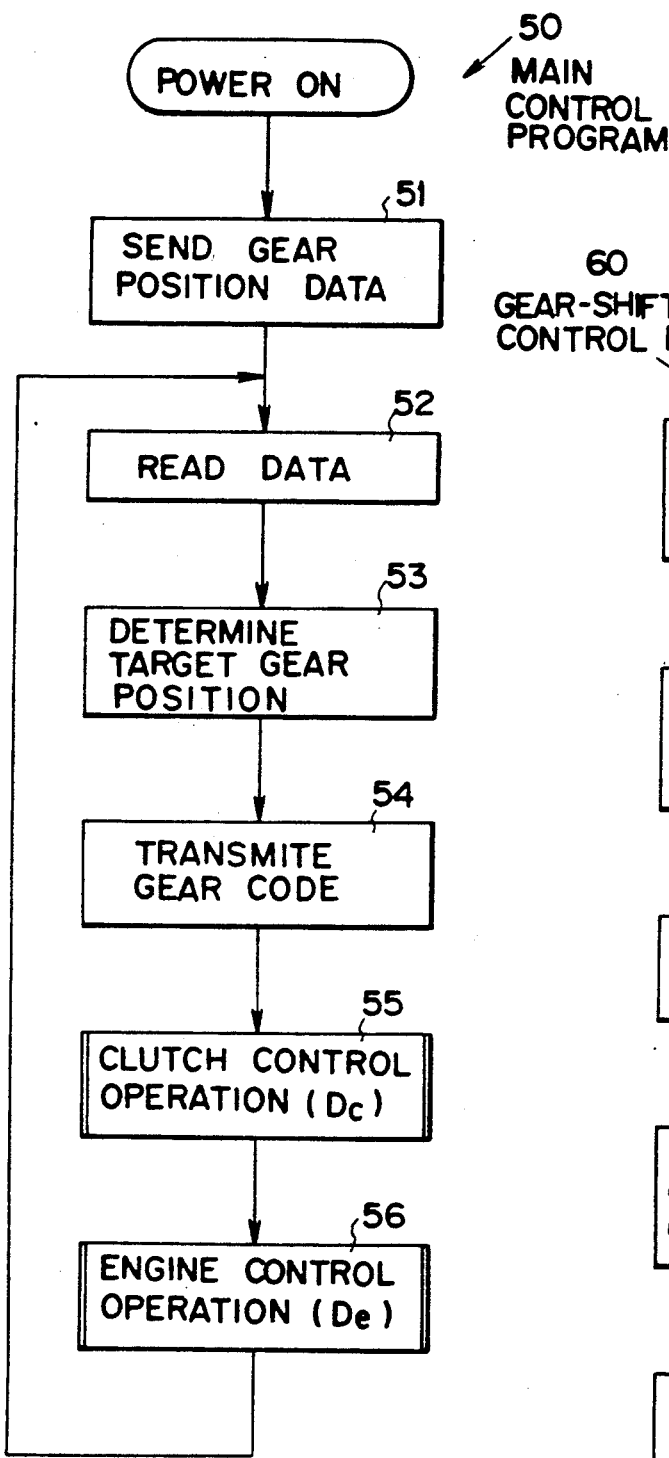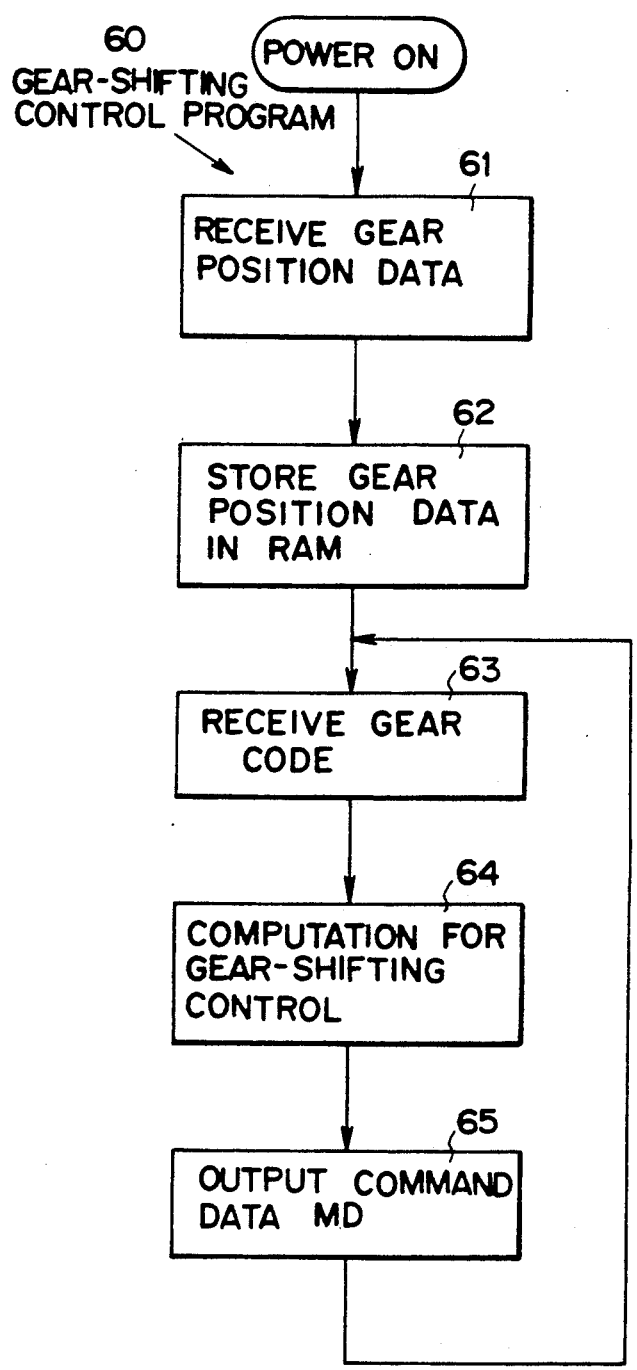

AUTOMATIC CONTROL SYSTEM FOR GEAR TRANSMISSION

BACKGROUND OF THE INVENTION

The present invention relates to a system for automatically controlling gear transmissions, and more particularly to an automatic control system for an automatic gear-shifting system including a gear transmission.

In the prior art, there have been proposed various kinds of automatic gear-shifting systems for automatically shifting a gear transmission. For example, Japanese Patent Application Public Disclosure No. Sho 60-175854 discloses an automatic gear-shift control system of this type in which a gear-shifting actuator device including a plurality of solenoid valves is coupled with a gear transmission for operating the same and the opening/closing states of these solenoid valves are controlled in response to a signal from a control unit including a computer, whereby the gear-shifting operation of the gear transmission is automatically carried out.

In most conventional systems of such type, the associated internal combustion engine is also electronically controlled by the same control unit as that for controlling the gear transmission, and the control unit is mounted at a safe place in the vehicle. This means that the control unit stores both data specifically related to engine operation and data specifically related the operation of the gear transmission. Therefore, since control units are used in many types of vehicles with various different combinations of engine and gear transmission, it is necessary to provide many kinds of control data for storage in the computerized control unit. Manufacturers thus have to provide many kinds of control units. This increases manufacturing and maintenance costs.

SUMMARY OF THE INVENTION

It is therefore an object of the present invention to provide an improved automatic control system for gear transmissions.

It is another object of the present invention to provide an automatic control system for gear transmissions which is widely adaptable for use in various automatic gear-shifting systems.

It is a further object of the present invention to provide a flexible automatic control system for gear transmissions realizable by a gear shift control unit which can be combined with any type of gear transmission.

According to the present invention, in an automatic control system for gear transmissions wherein an actuating means coupled with an operation member for the gear-shifting operating of a gear transmission is controlled for shifting the transmission to a target gear position according to a target signal, the system comprises a position sensor for producing a position signal indicating a current gear shift position of the transmission, a first control unit having a signal producing means for producing the target signal and a memory means for storing transmission data showing the relationship between the gear positions of the gear transmission and the position of the operation member and a second control unit responsive to the target signal, the transmission data and the position signal for producing a control signal for controlling the actuating means so as to position the operation member to a position corresponding to the target gear position.

Specific transmission data corresponding to the particular gear transmission of the vehicle concerned is stored in the memory means of the first control unit. On the other hand the second control unit is not required to store any specific transmission data peculiar to the particular associated gear transmission. In other words, the second control unit is adaptable to a gear transmission of any type and is able to produce a control signal for positioning the operation member of the associated gear transmission to the necessary position for the target gear position when the transmission data concerning the associated gear transmission and the target signal showing the target gear position are supplied thereto. The specific transmission data for the associated gear transmission required for shifting the transmission to the desired gear position by means of the second control unit as described above can be stored in advance to the memory means of the first control unit, so that the second control unit will be adaptable to any kind of gear transmission.

The invention will be better understood and other objects and advantages thereof will be more apparent from the following detailed description of a preferred embodiment with reference to the accompanying drawings.

BRIEF EXPLANATION OF THE DRAWINGS

FIG. 4 is a flow chart showing a main control program executed in the first control unit;

FIG. 5 is a flow chart showing a gear shift operating program executed in the second control unit.

DESCRIPTION OF THE PREFERRED EMBODIMENT

Figure 1:
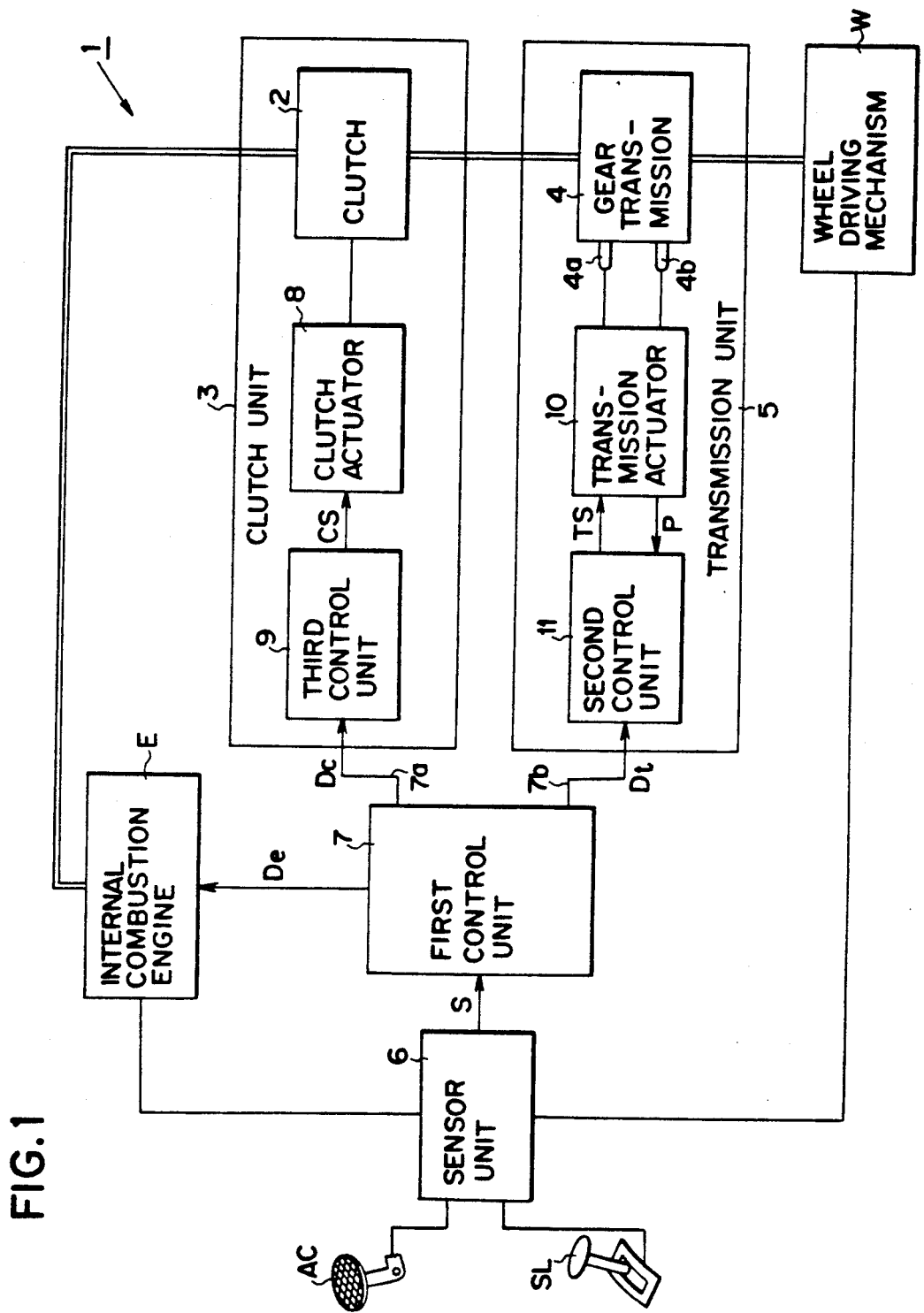
FIG. 1 is a block diagram showing an embodiment of an automatic gear-shift system according to the present invention.

FIG. 1 is a block diagram of an automatic gear-shifting system for vehicles according to the present invention. The automatic gear-shifting system 1 comprises a clutch unit 3 including a clutch 2, and a transmission unit 5 including a gear transmission 4. The clutch unit 3 and the transmission unit 5 are controlled by a first control unit 7 which receives a condition signal S from a sensor unit 6. The first control unit 7 serves also to electronically control the operation of an internal combustion engine E by which the vehicle (not shown) is powered, and the rotational output from the internal combustion engine E is transmitted through the clutch 2 and the gear transmission 4 to a wheel driving mechanism W.

As will be described in more detail hereinafter, the first control unit 7 is arranged as a microcomputer system, to produce clutch control data Dc, transmission control data Dt and engine control data De in response to the condition signal S representing the operation conditions of the vehicle detected by the sensor unit 6.

The clutch unit 3 has a clutch actuator 8 for engaging/disengaging (ON/OFF) the clutch 2 and a third control unit 9 for producing a clutch operation signal CS for controlling the clutch actuator 8 in response to the clutch control data Dc for commanding whether or not the clutch 2 is to be engaged. Thus, in the clutch unit 3 the engaging/disengaging operation of the clutch 2 is carried out by the control of the third control unit 9 in response to the clutch control data Dc supplied from the output line 7a of the first control unit 7 as an ON/OFF command signal.

The transmission unit 5 has a transmission actuator 10 which includes hydraulic cylinders used for shifting the gear transmission 4 to the desired gear position, and a second control unit 11 which is responsive to the transmission control data Dt supplied through an output line 7b of the first control unit 7. The second control unit 11 produces a transmission operation signal TS for shifting the gear transmission 4 to the target gear position in response to the transmission control data Dt. The gear transmission 4 has an operation member consisting of a shift operation member 4a and a select operation member 4b for carrying out the operation for shifting the gear transmission 4 to the target gear position, and the shift and select operation members 4a and 4b are coupled with hydraulic cylinders in the transmission actuator 10 as will be described later.

The second control unit 11 includes a microcomputer system whose arrangement will be described later on the basis of FIG. 3. The second control unit 11 of the transmission unit 5 receives the transmission control data Dt representing at least information concerning the target gear position and transmission data showing the relationship between the gear positions of the gear transmission 4 and the corresponding positions of the shift operation member 4a and the select operation member 4b. The second control unit 11 produces the transmission operation signal TS which is for shifting the gear transmission 4 to the desired target gear position. The transmission actuator 10 is responsive to the transmission operation signal TS for carrying out the gear shift operation.

Figure 2:
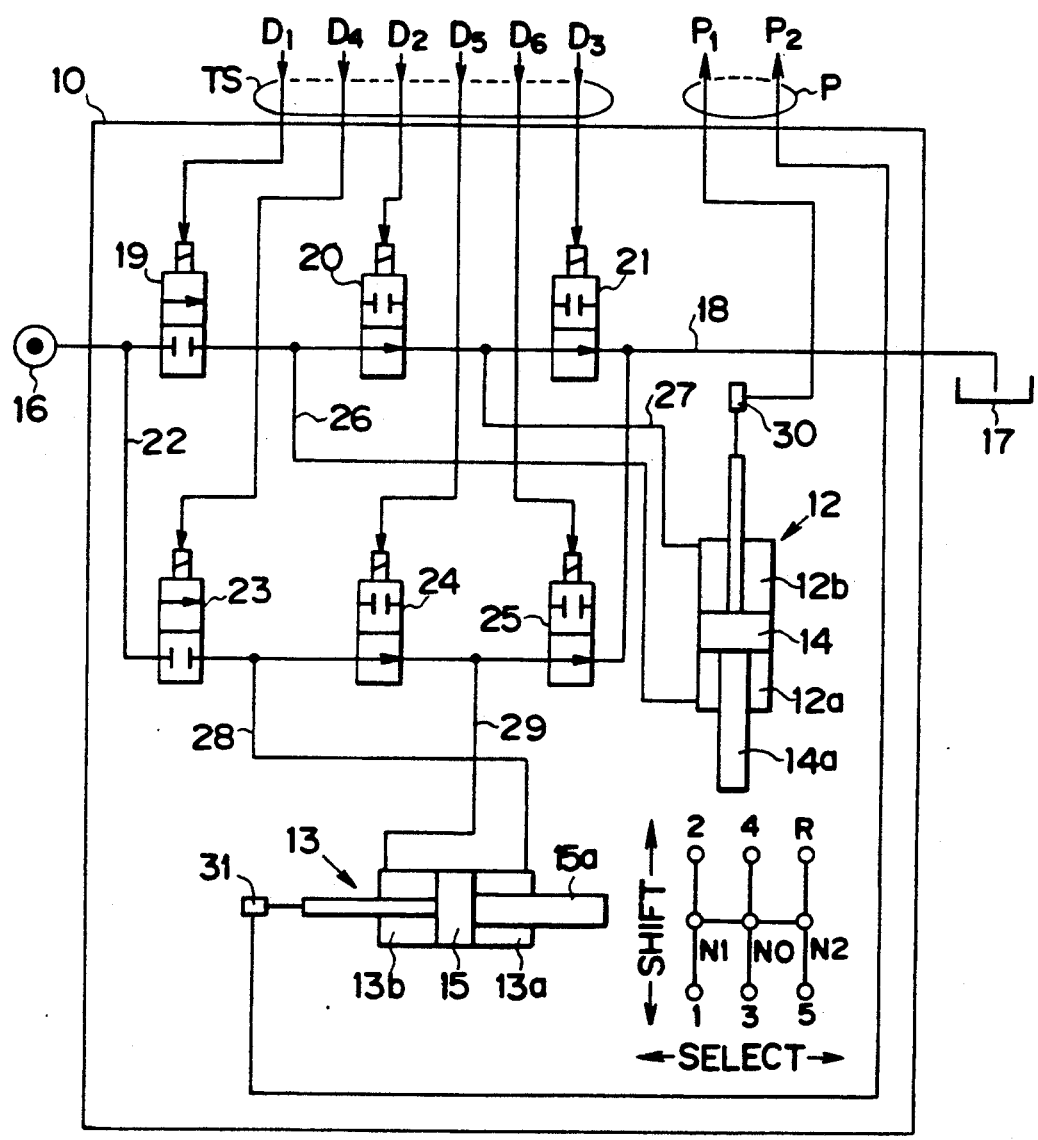
FIG. 2 is a detailed hydraulic circuit diagram of the transmission actuator shown in FIG. 1.

FIG. 2 shows the arrangement of the transmission actuator 10 shown in FIG. 1 in more detail. The transmission actuator 10 is constituted as a hydraulic type actuator and has a hydraulic cylinder 12 for a shift operation and a hydraulic cylinder 13 for a select operation. These hydraulic cylinders 12 and 13 have differential pistons 14 and 15, respectively. In the hydraulic cylinder 12, a first chamber 12a is defined by the active surface with smaller area of the differential piston 14 and a second chamber 12b is defined by the active piston surface with larger area. Similarly, in the hydraulic cylinder 13a first chamber 13a is defined by the active piston surface with smaller area of the differential piston 15 and a second chamber 13b is defined by the active piston surface with larger area.

A hydraulic oil pipe 18 provided between a hydraulic power source 16 and a tank 17 and the hydraulic oil pipe 18 has a first solenoid valve 19 of normally closed type, a second solenoid valve 20 of normally open type and a third solenoid valve 21 of normally open type. Another hydraulic oil pipe 22 is arranged in parallel with the hydraulic oil pipe 18 so as to bypass the solenoid valves 19 to 21, and the hydraulic oil pipe 22 has a fourth solenoid valve 23 of normally closed type, a fifth solenoid valve 24 of normally open type, and a sixth solenoid valve 25 of normally open type. One end of a hydraulic oil pipe 26 is connected with the outlet of the first solenoid valve 19 and the other end thereof communicates with the first chamber 12a of the hydraulic cylinder 12. Similarly, the outlet of the second solenoid valve 20 is communicated through a hydraulic oil pipe 27 with the second chamber 12b of the hydraulic cylinder 12. The first chamber 13a of the hydraulic cylinder 13 is communicated through a hydraulic oil pipe 28 with the outlet of the fourth solenoid valve 23, and the second chamber 13b of the hydraulic cylinder 13 is communicated through a hydraulic oil pipe 29 with the outlet of the fifth solenoid valve 24.

Therefore, the piston 14 of the hydraulic cylinder 12 moves in response to the operations of the first to third solenoid valves 19 to 21, and the movement of the piston 14 causes a piston rod 14a to operate the shift operation member 4a coupled with the piston rod 14a along the shift direction show in FIG. 2. The position of the piston rod 14a is detected by a position sensor 30 and the resulting output signal from the position sensor 30 is supplied as a shift position signal $P_1$ to the second control unit 11. On the other hand, the piston 15 of the hydraulic cylinder 13 moves in response to the operations of the fourth to sixth solenoid valves 23 to 25, and the movement of the piston 15 causes a piston rod 15a to operate the select operation member 4b coupled with the piston rod 15a along the select direction shown in FIG. 2. The position of the piston rod 15a is detected by a position sensor 31 and the resulting output signal from the position sensor 31 is supplied as a select position signal $P_2$ to the second control unit 11. Piston rods 14a and 15a thereby cause a gear of gear transmission 4 to move along gear shifting paths between the six gear shift positions 1, 2, 3, 4, 5 and R as illustrated in FIG. 2.

First to sixth driving signals $D_1$ to $D_6$ forming the transmission operation signal TS are supplied from the second control unit 11 to the first to sixth solenoid valves 19 to 21, and 23 to 25, respectively, in order to drive these solenoid valves, and the shift and select position signals $P_1$ and $P_2$ are supplied as a position signal P to the second control unit 11.

Figure 3:
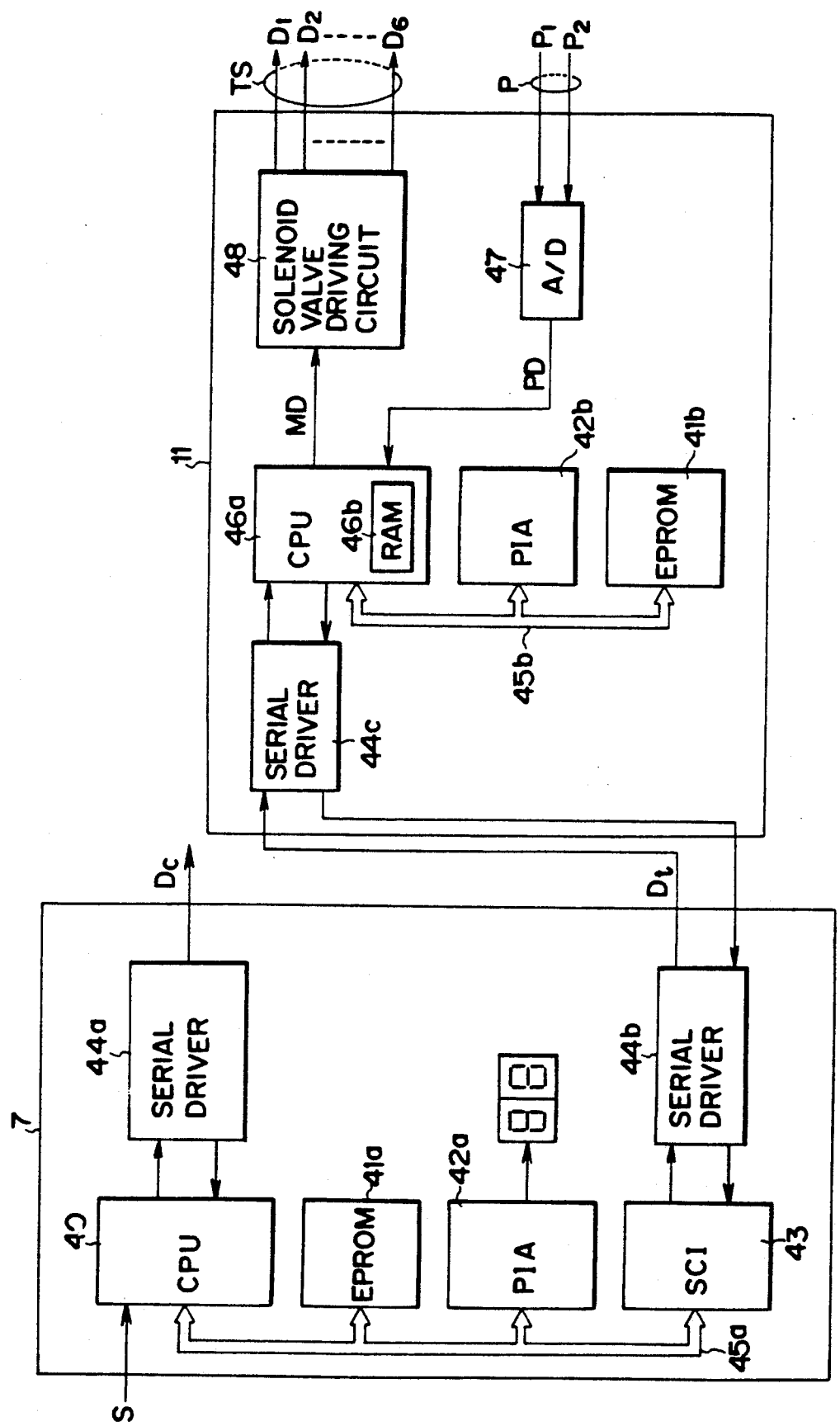
FIG. 3 is a detailed block diagram showing the first and second control units of FIG. 1.

FIG. 3 is a detailed block diagram showing the arrangements of the first and second control units 7 and 11. The first control unit 7 has a central processing unit (CPU) 40, an erasable programable read-only memory (EPROM) 41a, a peripheral interface adapter (PIA) 42a and a serial comunication interface (SCI) 43, which are interconnected with each other by means of a data bus 45a which enable intercommunication among them. Reference numerals 44a and 44b designate serial drivers.

The second control unit 11 has a central processing unit (CPU) 46a including a random access memory 46b, an erasable programble read-only memory (EPROM) 41b, a peripheral interface adapter (PIA) 42b and a serial driver 44c. The CPU 46a, EPROM 41b and PIA 42b are interconnected by a data bus 45b.

An analog-digital (A/D) converter 47 is responsive to the shift and select position signals $P_1$ and $P_2$ and converts these signals into output data PD in the corresponding digital form. The output data PD from the A/D converter 47 is supplied to the CPU 46a. The command data MD is for controlling the operations of the solenoid valves 19 to 21 and 23 to 25 of the transmission actuator 10 in order to shift the gear transmission 4 from the present gear position shown by the output data PD to the target gear position determined in the first control unit 7 and is composed of six command signals, one for each of the six solenoid valves of the transmission actuator 10. A solenoid valve driving circuit 48 is responsive to the command signals for commanding the corresponding solenoid valves to open/close, and produces the transmission operation signal TS which causes the transmission actuator 10 to operate the shift and select operation members 4a and 4b. The solenoid valve driving circuit 48 may be arranged by the use of switching transistors so as to produce the first to sixth driving signals $D_1$ to $D_6$ in response to the respective command signals.

FIG. 4 is a flow chart showing a main control program 50 executed in the first control unit 7 and FIG. 5 is a flow chart showing a gear-shifting control program 60 executed in the second control unit 11. The gear-shifting control operation carried out in the automatic gear-shifting system 1 will now be described in conjunction with FIGS. 4 and 5.

The execution of the main control program 50 starts in response to the power-on action of the system 1, and the transmission data is transmitted at step 51 as a part of the transmission control data Dt in the form of serial data from the serial driver 44b of the first control unit 7 to the second control unit 11. The transmission data is data representing the relationship between the gear positions of the gear transmission 4 and the corresponding positions of the select and shift operation members 4a and 4b on a prescribed coordinate system, and the transmission data may be stored in the EPROM 41a in advance in a suitable manner. Consequently, when any target gear position is given to the second control unit 11, it is possible with reference to the transmission data to determine the corresponding target positions at which the respective operation members 4a and 4b of the gear transmission 4 are to be positioned.

The operation moves to step 52 wherein the data necessary for the gear-shift control operation is read in response to the condition signals S from the sensor unit 6. In this embodiment, the condition signal S includes acceleration data indicating the amount of operation of an accelerator pedal AC, selector data indicating the position selected by a selector SL, vehicle speed data indicating the vehicle speed and engine speed data indicating the rotational speed of the internal combustion engine E. In step 53 the gear position suitable for the operation condition shown by the condition signal S at that time is determined as a target gear position on the basis of the input data read in step 52 in accordance with a gear-shift map data, which is stored in the EPROM 41a in advance.

The first control unit 7 has a set of gear codes corresponding to the respective gear shift positions of the gear transmission 4, and the gear code corresponding to the target gear shift position determined in step 53 is transmitted from the first control unit 7 as a target signal to the second control unit 11 in step 54. The target signal transmitted from the first control unit 7 is sent as a part of the transmission control data Dt from the serial driver 44b and is received by the serial driver 44c of the second control unit 11.

The operation moves steps 55 and 56 wherein data processing operations for controlling the clutch 2 and the internal combustion engine E are carried out to output the clutch control data Dc and the engine control data De, respectively. After this, the operation is carried out repeatedly from step 52 to step 56.

Thus, the transmission data and the gear code are supplied from the first control unit 7 to the transmission unit 5.

The execution of the gear-shifting control program 60 also starts in response to the power-on operation of the system 1 and at first the transmission data sent from the first control unit 7 is received in step 61. The received transmission data is stored in the RAM 46b in the CPU 46a in step 62. Then, the operation moves to step 63 in which the gear code representing the target gear position at that time is received. After this, the operation moves to step 64 in which the output data PD is read in and computation is conducted as necessary for operating the shift and select operation members 4a and 4b of the gear transmission 4 for shifting the gear transmission 4 from the present gear position indicated by the output data PD to the target gear position indicated by the received gear code with reference to the transmission data stored in the RAM 46b. In step 65 the command data MD is produced on the basis of the result of the computation executed in step 64. The solenoid valve driving circuit 48 is responsive to the command data MD to produce the transmission operation signal TS. As a result, the gear transmission 4 is operated by the transmission actuator 10 to shift the transmission 4 to the target gear position. After the termination of the execution of step 65 the operation returns to step 63 to execute steps 63 to 65 repeatedly.

As described above, the second control unit 11 is responsive to the position signal P, the transmission data and the gear code indicating the target gear position to carry out the control operation for shifting the gear transmission 4 from the present position indicated by the position signal P to the target gear position indicated by the given gear code. Such a control operation for shifting the transmission is well known technique per se, and it is, of course, possible to realize the data processing operation shown in steps 64 and 65 of FIG. 5 in the various forms by the use of the suitable conventional techniques. One example will be described.

In this example, the following eleven kinds of gear codes are established:

| CODE | CONTENT |
| --- | --- |
| $01 | Set to 1st position |
| $02 | Set to 2nd position |
| $03 | Set to 3rd position |
| $04 | Set to 4th position |
| $05 | Set to 5th position |
| $06 | Set to Rev. position |
| $07 | Set to $N_1$ position |
| $08 | Set to $N_2$ position |
| $09 | Set to $N_0$ position |
| $F7 | Set gear shifting mode |
| $F6 | Cancel gear shifting mode |

Figure 6:
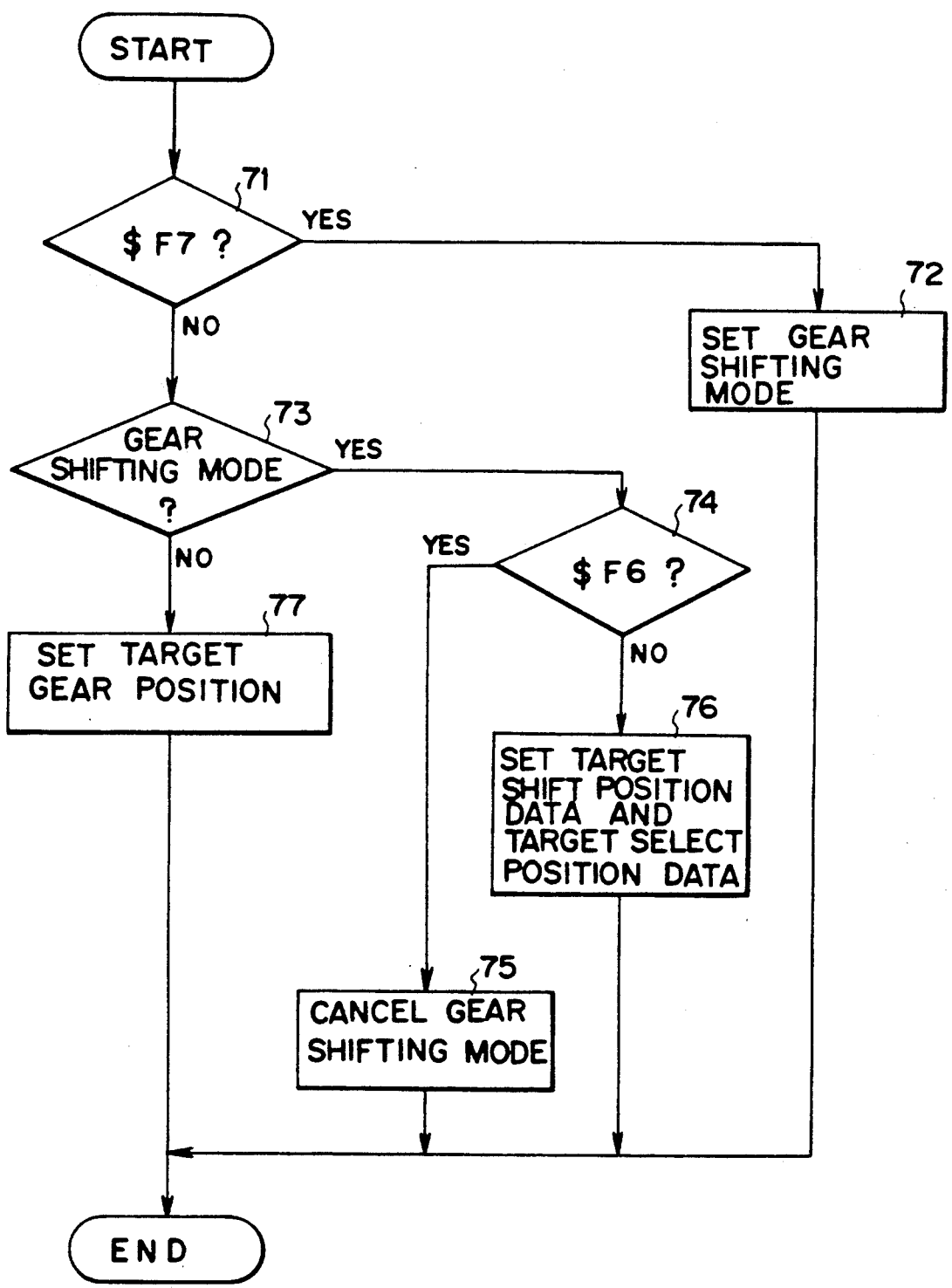
FIG. 6 is a flow chart showing a gear code processing program executed in the second control unit.

The received gear code is processed on the basis of a processing program 70 shown in FIG. 6, the execution of which is started upon the receipt of any gear code. At first, step 71 is executed in which it is discriminated whether or not the received gear code is $F7. When the received gear code is $F7 the determination in step 71 becomes YES and the operation moves to step 72, in which the gear shifting mode which enable the transmission 4 to shift to the desired gear position is established in the second control unit 11. When the determination in step 71 is NO, the operation moves to step 73 wherein discrimination is made as to whether or not the gear shifting mode has been established. When the gear shifting mode has been established the determination in step 73 becomes YES and the operation moves to step 74 in which discrimination is made as to whether or not the received gear code is $F6 (which indicates the completion of gear shifting). When the received gear code is $F6 the determination in step 74 becomes YES and the operation moves to step 75 in which the gear setting mode is canceled, and the operation of this program is terminated.

When the determination in step 74 is NO, the operation moves to step 76 in which target select position data and target shift position data are determined on the basis of the data which has already been received from the first control unit 7. The target select position data is data for positioning the select operation member 4a to shift the transmission 4 to the target gear position indicated by the received gear code. On the other hand, the target shift position data is data for positioning the shift operation member 4b to shift the transmission 4 to the target gear position indicated by the received gear code. The command data MD is produced from the second control unit 11 on the basis of the target select and shift position data obtained in step 76.

When the determination in step 73 becomes NO, the operation moves to step 77 wherein the target gear position is set on the basis of the received gear code, and the execution of the processing program 70 is terminated.

As described above, the target select and shift position data corresponding to the desired target gear position is set to produce the command data MD only when the second control unit 11 is set to the gear shifting mode by receipt of the gear code SF7, whereafter the gear setting operation is permitted. However, the target select and shift position data is not set in the case where the gear shifting mode is canceled upon the receipt of the gear code SF6.

That is, the extablishment/cancellation of the gear shifting mode in the second control unit 11 can be controlled by data supplied from the first control unit 7, so that undesired gear shift operation which might be caused by, for example, a noise signal can be effectively prevented. This serves to suppress erroneous operation.

According to the arrangement described above, since the information concerning the target gear position and the transmission data are supplied from the first control unit 7 to the second control unit 11 and the control operation for shifting the gear transmission 4 is carried out by the second control unit 11 on the basis of the information and data supplied from the first control unit 7 and the position signal P, no change of the programs stored in the second control unit 11 is required, and it is only necessary to change the control data stored in the first control unit 7. As a result, the second control unit 11 can be widely used for operating various types of gear transmissions.

What is claimed is:

1. A system for automatically controlling a gear transmission, said system comprising:
   operation means for changing a gear position of said gear transmission;
   actuating means coupled with said operation means for actuating said operation means;
   sensing means for producing a position signal indicating an actual position of said operation means;
   a first control unit including means for generating a target signal representing a target gear position to which said gear transmission is to be shifted, and a first memory means for storing transmission data showing relationships between specific gear positions of said gear transmission and positions of said operation means; and
   a second control unit including a second memory means for receiving and storing the transmission data from said first control unit, and command means responsive to the target signal, the transmission data and the position signal for generating a command signal for controlling said actuating means so as to position said operation means to a position corresponding to the target gear position.

2. A system as claimed in claim 1, wherein the command means includes a calculating means responsive to the target signal, the position signal and the transmission data for calculating a position at which said operation means is to be positioned for shifting said gear transmission to the target gear position.

3. A system as claimed in claim 1, wherein said operation means comprises a shift operation member for moving a gear of said gear transmission along a shift direction and a select operation member for moving the gear of said gear transmission along a select direction, and wherein said actuating means includes a first actuator for actuating the shift operation member and a second actuator for actuating the select operation member.

4. A system as claimed in claim 1, wherein said second control unit and said actuating means are integrally mounted on said gear transmission.

5. A system as claimed in claim 1, wherein said first control unit has functions for controlling a clutch and an internal combustion engine associated with said gear transmission.

6. A system for automatically controlling a gear transmission coupled through a clutch with an internal combustion engine mounted on a vehicle, said system comprising:
   operation means for changing a gear position of said gear transmission;
   actuating means coupled with said operating means for actuating said operation means;
   detecting means for producing output data indicating an actual gear position of said gear transmission;
   a sensor unit for producing a condition signal indicative of at least one operation condition of the vehicle;
   a first control unit including a determining means responsive to the condition signal for determining a target gear position to which said gear transmission is to be shifted, and a first memory means for storing transmission data showing relationships between specific gear positions of said gear transmission and positions of said operation means; and
   a second control unit including a second memory means for receiving and storing the transmission data from said first control unit, and command means responsive to said determining means, the transmission data and the output data for generating a command signal for controlling said actuating means so as to position said operation means to a position corresponding to the target gear position determined by said determining means.

7. A system as claimed in claim 6, wherein said determining means produces a target signal indicating the target gear position and the target signal is transmitted from said first control unit to said second control unit.

8. A system as claimed in claim 6, wherein said operation means comprises a shift operation member for moving a gear of said gear transmission along a shift direction and a select operation member for moving the gear of said gear transmission along a select direction, and wherein said actuating means includes a first actuator for actuating the shift operation member and a second actuator for actuating the select operation member.

9. A system as claimed in claim 6, wherein said second control unit and said actuating means are integrally mounted on said gear transmission.

10. A system as claimed in claim 6, wherein said first control unit has functions for controlling a clutch and an internal combustion engine associated with said gear transmission.

* * * * *